(12) United States Patent
Kusama et al.

(10) Patent No.: US 10,418,599 B2
(45) Date of Patent: Sep. 17, 2019

(54) TERMINAL-EQUIPPED BATTERY CASE LID AND SEALED BATTERY

(71) Applicant: TOYOTA JIDOSHA KABUSHIKI KAISHA, Toyota-shi, Aichi-ken (JP)

(72) Inventors: Kazuyuki Kusama, Nagoya (JP); Shigeru Matsumoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 307 days.

(21) Appl. No.: 15/531,988

(22) PCT Filed: Nov. 26, 2015

(86) PCT No.: PCT/IB2015/002216
§ 371 (c)(1),
(2) Date: May 31, 2017

(87) PCT Pub. No.: WO2016/087918
PCT Pub. Date: Jun. 9, 2016

(65) Prior Publication Data
US 2018/0337371 A1    Nov. 22, 2018

(30) Foreign Application Priority Data

Dec. 1, 2014  (JP) .................................. 2014-242831

(51) Int. Cl.
*H01M 2/04* (2006.01)
*H01M 2/02* (2006.01)
(Continued)

(52) U.S. Cl.
CPC ........... *H01M 2/02* (2013.01); *H01M 2/0439* (2013.01); *H01M 2/0473* (2013.01); *H01M 2/06* (2013.01); *H01M 2/08* (2013.01); *H01M 2/263* (2013.01); *H01M 2/30* (2013.01); *H01M 10/0525* (2013.01); *H01M 10/0583* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| 2010/0068616 A1 | 3/2010 | Uh |
| 2012/0225348 A1 | 9/2012 | Kim |
| 2015/0017501 A1 | 1/2015 | Harayama |

FOREIGN PATENT DOCUMENTS

| JP | 2010-73688 A | 4/2010 |
| JP | 2013-048047 A | 3/2013 |
| WO | 2013/030880 A1 | 3/2013 |

*Primary Examiner* — Ula C Ruddock
*Assistant Examiner* — Tony S Chuo
(74) *Attorney, Agent, or Firm* — Sughrue Mion, PLLC

(57) ABSTRACT

A portion of an insulation member makes contact with a surface of a lid body by receiving a caulking force from a caulking member either directly or indirectly via another member. When not receiving the caulking force, a surface of the portion of the insulation member facing the lid body becomes a curved surface which indicates a curve bulging in a load direction of a caulking load on a cut plane, the cut plane cutting the portion of the insulation member in a longitudinal direction of the lid body. When kept in the fastened state by receiving the caulking force, the portion of the insulation member is elastically deformed and the surface of the portion of the insulation member facing the lid body is brought into close contact with the surface of the lid body.

4 Claims, 10 Drawing Sheets

(51) Int. Cl.
 *H01M 2/06* (2006.01)
 *H01M 2/08* (2006.01)
 *H01M 2/26* (2006.01)
 *H01M 2/30* (2006.01)
 *H01M 10/0525* (2010.01)
 *H01M 10/0583* (2010.01)

TERMINAL-EQUIPPED BATTERY CASE LID AND SEALED BATTERY

CROSS REFERENCE TO RELATED APPLICATIONS

This application is a National Stage of International Application No. PCT/IB2015/002216 filed Nov. 26, 2015, claiming priority based on Japanese Patent Application No. 2014-242831 filed Dec. 1, 2014, the contents of all of which are incorporated herein by reference in their entirety.

BACKGROUND OF THE INVENTION

1. Field of the Invention

The invention relates to a terminal-equipped battery case lid and a sealed battery using the same.

2. Description of Related Art

There are proposed various kinds of terminal-equipped battery case lids and sealed batteries (see, e.g., Japanese Patent Application Publication No. 2013-48047 (JP 2013-48047 A)).

JP 2013-48047 A discloses a terminal-equipped battery case lid set forth below. Specifically, JP 2013-48047 A discloses a terminal-equipped battery case lid including: a lid body formed in an elongated flat plate shape and having lid through-holes formed in the longitudinal opposite end portions of the lid body so as to extend through the lid body; an insulation member disposed so as to make contact with the lid body and having an insulation through-hole (insulator opening portion) extending through the insulation member; an external terminal (connection terminal) having a terminal through-hole (caulking hole portion) extending through the external terminal; and a caulking member (collector terminal) inserted into each of the lid through-holes, the insulation through-hole and the terminal through-hole, the caulking member deformed to fasten the lid body, the insulation member and the external terminal together when a caulking load is applied to the caulking member from one side.

Furthermore, JP 2013-48047 A discloses a sealed battery including: a battery case formed in a box shape having an opening and configured to accommodate an electrode body and the like; and a terminal-equipped battery case lid having a lid body which closes the opening of the battery case. In the sealed battery, the opening of the battery case is sealed by welding the lid body and the battery case in a state where the opening of the battery case for accommodating the electrode body and the like is closed by the lid body of the terminal-equipped battery case lid.

However, the lid body is deformed when manufacturing the terminal-equipped battery case lid configured as above. Specifically, if the lid body, the insulation member and the external terminal are fastened together by inserting the caulking member (caulking portion) into each of the lid through-holes of the lid body, the insulation through-hole of the insulation member and the terminal through-hole of the external terminal, applying a caulking load to the caulking member from one side and compressively deforming the caulking portion so as to be enlarged in a radial direction, the region of the lid body (the region around each of the lid through-holes) which receives a caulking force applied by the caulking member is bent (curved). The bending (curvature) occurs in such a form that the region of the lid body bulges in a direction opposite to the load direction of the caulking load on a cut plane which cuts the lid body in the longitudinal direction of the lid body. Since the caulking is performed in the opposite end portions of the lid body, the bending (curvature) is generated in the opposite end portions of the lid body. As a result, the region of the lid body (the majority of the lid body) positioned between the opposite end portions of the lid body is curved in such a form as to bulge in a direction opposite to the load direction of the caulking load on a cut plane which cuts the lid body in the longitudinal direction of the lid body.

Thus, if the degree of deformation of the lid body is large, there may be a case where a gap is generated between the battery case and the lid body when the opening of the battery case is closed by the lid body. If the lid body and the battery case are welded in this state, variations are generated in the penetration depth of welding. There is also a possibility of generating welding defects (for example, a welding defect that the penetration depth of welding becomes smaller than a permissible lower limit value in the region where the gap is generated when the opening of the battery case is closed by the lid body).

SUMMARY OF THE INVENTION

The invention provides a terminal-equipped battery case lid in which the degree of deformation of a lid body is made small, and a sealed battery using the same.

One aspect of the invention is directed to a terminal-equipped battery case lid, including: a lid body formed in an elongated flat plate shape and having lid through-holes formed in longitudinal opposite end portions of the lid body; an insulation member disposed so as to make contact with a surface of the lid body and having an insulation through-hole extending through the insulation member; an external terminal having a terminal through-hole extending through the external terminal; and a caulking member inserted into each of the lid through-holes, the insulation through-hole and the terminal through-hole, the caulking member being deformed by a caulking load, which is applied to the caulking member from one side, to fasten the lid body, the insulation member and the external terminal together. A portion of the insulation member, which makes contact with the surface of the lid body by receiving a caulking force from the caulking member either directly or indirectly via another member, is configured such that: when not receiving the caulking force, a surface of the portion of the insulation member facing the lid body becomes a curved surface which indicates a curve bulging in a load direction of the caulking load on a cut plane, the cut plane cutting the portion of the insulation member in a longitudinal direction of the lid body; and when kept in a fastened state by receiving the caulking force, the portion of the insulation member is elastically deformed and the surface of the portion of the insulation member facing the lid body is brought into close contact with the surface of the lid body.

In the terminal-equipped battery case lid described above, the portion (referred to as "force-receiving insulation portion") of the insulation member, which makes contact with the surface of the lid body by receiving the caulking force from the caulking member either directly or indirectly via another member, has the following form. Specifically, when not receiving the caulking force, the surface of the force-receiving insulation portion facing the lid body becomes a curved surface which indicates a curve bulging in the load direction of the caulking load (the applying direction of the caulking load) on the cut plane, the cut plane cutting the force-receiving insulation portion in the longitudinal direction of the lid body. That is to say, the surface of the force-receiving insulation portion facing the lid body takes a form opposite to "the form into which the portion (referred to as "force-receiving lid body portion") of the lid body receiving the caulking force of the caulking member tend to be deformed by the caulking force". When fastened by the caulking force as mentioned above, the force-receiving insulation portion is elastically deformed and the surface of the force-receiving insulation portion facing the lid body is brought into close contact with the surface of the lid body (namely, deformed into a planar surface).

Thus, when the fastening is performed by the caulking member, a force (restoring force) which tries to return the surface facing the lid body to the pre-deformation form (namely, the form opposite to the form into which the portion of the lid body receiving the caulking force of the caulking member tend to be deformed) is generated in the force-receiving insulation portion elastically deformed by the caulking force. Thus, the force-receiving lid body portion (the portion of the lid body receiving the caulking force of the caulking member), which tends to be bent in such a form as to bulge in the direction opposite to the load direction of the caulking load on the cut plane cutting the lid body in the longitudinal direction of the lid body, is pressed in the deformation-preventing direction by the surface of the force-receiving insulation portion facing the lid body. This makes it possible to reduce the degree of bending of the force-receiving lid body portion when the fastening is performed by the caulking member. As a result, it is also possible to reduce the degree of bending of the region of the lid body positioned between the opposite end portions (the two force-receiving lid body portions) of the lid body. Accordingly, the terminal-equipped battery case lid described above becomes a terminal-equipped battery case lid in which the deformation degree of the lid body is made small.

In the terminal-equipped battery case lid described above, the insulation member may be interposed between the lid body and the external terminal and may electrically insulate the lid body and the external terminal. A portion of the insulation member, which receives the caulking force via the external terminal and is pressed by the external terminal to make contact with the surface of the lid body, may be configured such that: when not receiving a pressing force from the external terminal, a surface of the portion of the insulation member facing the lid body becomes a curved surface which indicates a curve bulging in a direction of the pressing force on a cut plane, the cut plane cutting the portion of the insulation member in the longitudinal direction of the lid body; and when receiving the pressing force, the portion of the insulation member is elastically deformed and the surface of the portion of the insulation member facing the lid body is brought into close contact with the surface of the lid body.

The terminal-equipped battery case lid described above includes, as "the insulation member", an insulation member interposed between the lid body and the external terminal and configured to electrically insulate the lid body and the external terminal. In this insulation member, "the portion of the insulation member which receives the caulking force via the external terminal and is pressed by the external terminal to make contact with the surface of the lid body" corresponds to "the portion (force-receiving insulation portion) of the insulation member which makes contact with the surface of the lid body by receiving the caulking force from the caulking member either directly or indirectly via another member".

In the insulation member, "the portion (the force-receiving insulation portion), which receives the caulking force via the external terminal and is pressed by the external terminal to make contact with the surface of the lid body" has the following form. Specifically, when not receiving the pressing force from the external terminal, the surface facing the lid body becomes a curved surface which indicates a curve bulging in the direction of the pressing force on the cut plane, the cut plane cutting the force-receiving insulation portion in the longitudinal direction of the lid body. When receiving the pressing force, the force-receiving insulation portion is elastically deformed and the surface of the force-receiving insulation portion facing the lid body is brought into close contact with the lid body (namely, deformed into a planar surface). Use of the insulation member makes it possible to achieve the aforementioned actions and effects when performing the caulking described above. Accordingly, the terminal-equipped battery case lid described above becomes a terminal-equipped battery case lid in which the deformation degree of the lid body is made small.

In the terminal-equipped battery case lid, the external terminal may include: a flat plate-shaped pressing portion that presses the insulation member, the pressing portion having the terminal through-hole; a flat plate-shaped spaced-apart portion spaced apart from the lid body farther than the pressing portion, the spaced-apart portion extending parallel to the pressing portion; and a connection portion that interconnects the pressing portion and the spaced-apart portion.

Another aspect of the invention is directed to a sealed battery including: a box-shaped battery case having an opening; and a terminal-equipped battery case lid including a lid body that closes the opening of the battery case, the lid body and the battery case being welded in a state where the opening of the battery case is closed by the lid body, wherein the terminal-equipped battery case lid is one of the terminal-equipped battery case lids described above.

The aforementioned sealed battery includes, as the terminal-equipped battery case lid, one of the terminal-equipped battery case lids described above. The terminal-equipped battery case lid is a terminal-equipped battery case lid in which the degree of deformation of the lid body is small. This makes it possible to reduce a gap between the battery case and the lid body or to prevent generation of a gap when the opening of the battery case is closed by the lid body of the terminal-equipped battery case lid. It is therefore possible to reduce variations in the penetration depth of welding when the lid body and the battery case are welded. It is also possible to reduce (or prevent) generation of welding defects (for example, a welding defect that the penetration depth of welding becomes smaller than a permissible lower limit value in the region where the gap is generated when the opening of the battery case is closed by the lid body).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
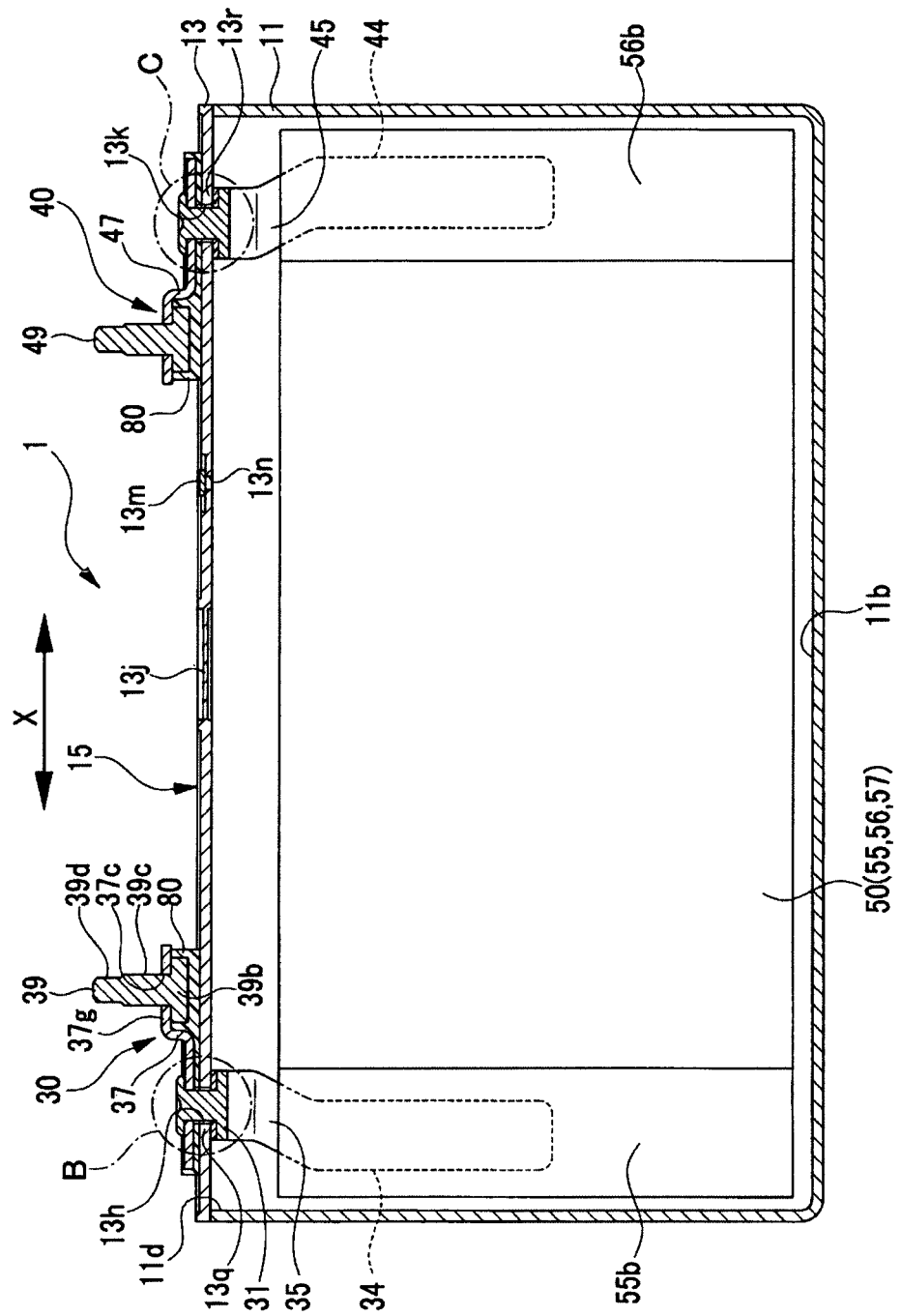
FIG. 1 is a view illustrating a sealed battery according to an embodiment.
Figure 2:
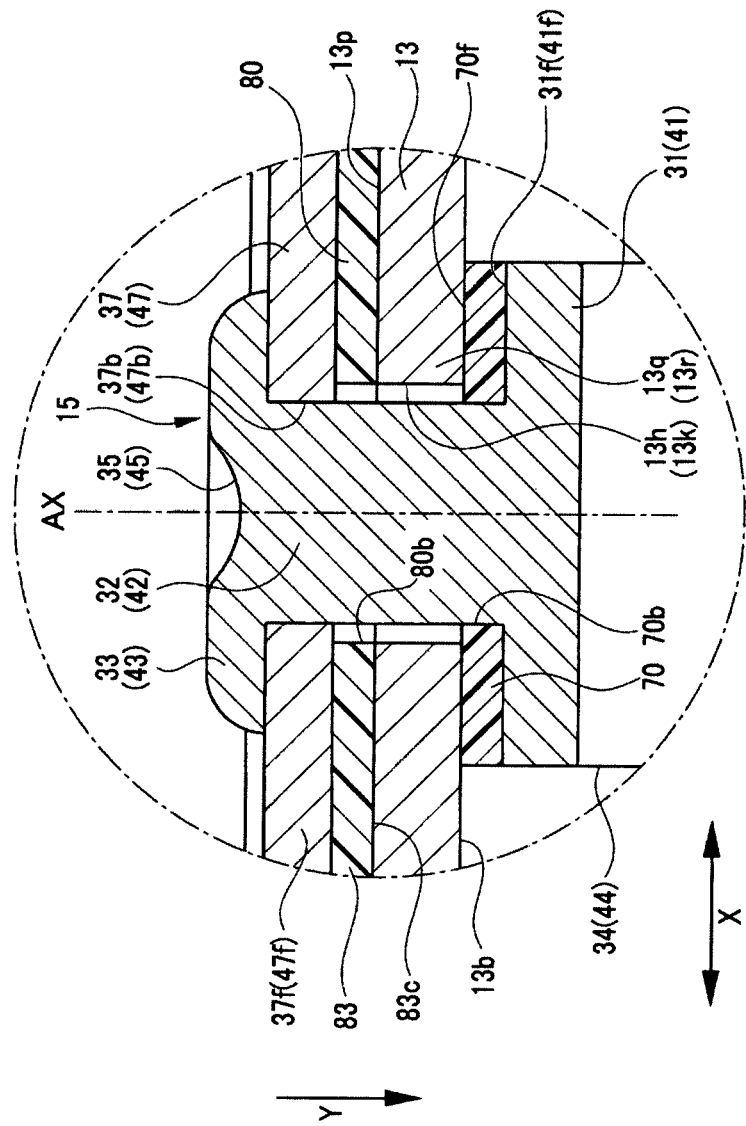
FIG. 2 is an enlarged view of a B region and a C region indicated in FIG. 1.
Figure 3:
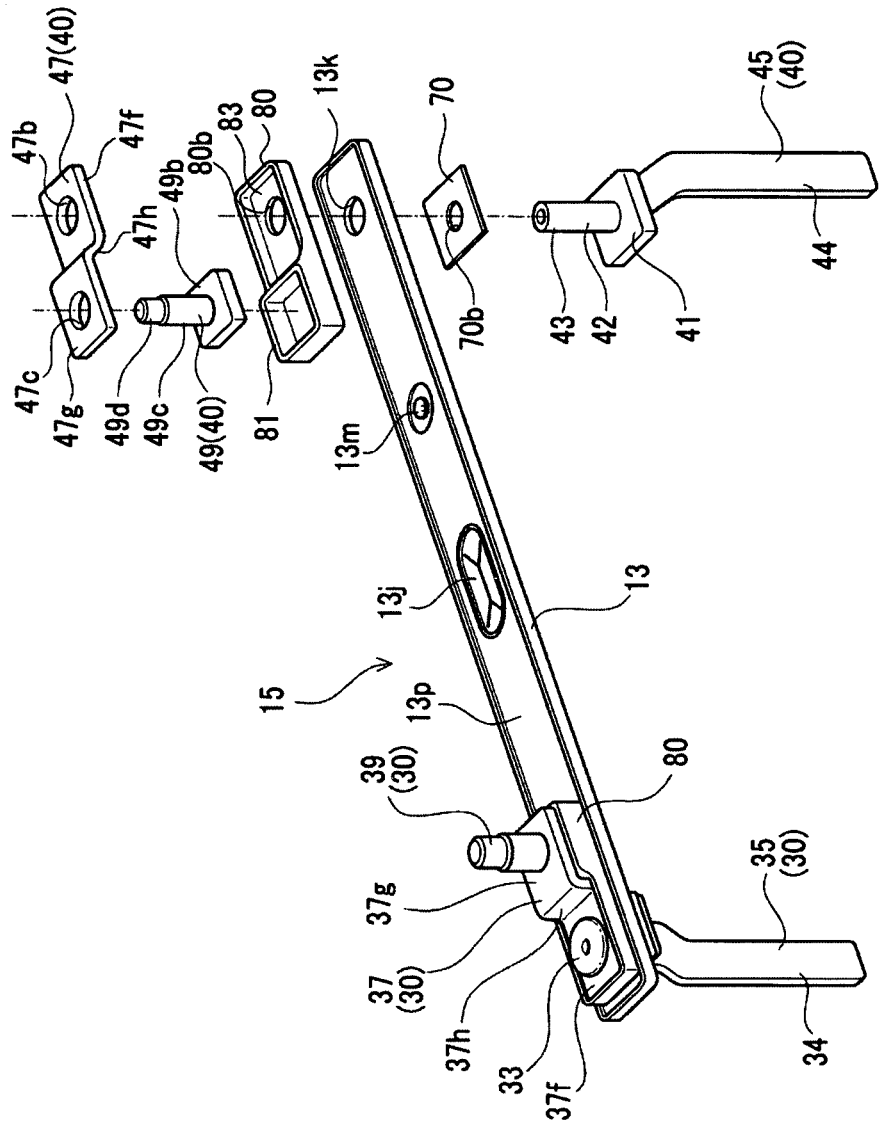
FIG. 3 is an exploded perspective view of a terminal-equipped battery case lid according to an embodiment.

Embodiments of the invention will now be described with reference to the drawings. FIG. 1 is a sectional view of a sealed battery 1 according to the present embodiment. FIG. 2 is an enlarged view of a B region and a C region indicated in FIG. 1. Members of the C region, which differ from those of the B region, are designated by reference symbols put in parentheses in FIG. 2. FIG. 3 is a partially exploded perspective view of a terminal-equipped battery case lid 15 according to the present embodiment.

As illustrated in FIG. 1, the sealed battery 1 according to the present embodiment is a lithium-ion secondary battery which includes a rectangular box-shaped battery case 11 having an opening 11d and an electrode body 50 provided inside the battery case 11. Furthermore, the sealed battery 1 includes the terminal-equipped battery case lid 15 having a lid body 13 which closes the opening 11d of the battery case 11. The battery case 11 and the lid body 13 are a single piece formed by whole circumference welding.

The electrode body 50 has an elliptical cross-sectional shape. The electrode body 50 is a flat wound body formed by laminating and winding a positive electrode plate 55, a negative electrode plate 56 and a separator 57, all of which have a sheet-like shape. The electrode body 50 includes a positive electrode wound portion 55b, which is positioned in one end portion (the left end portion in FIG. 1) of the axis direction of the electrode body 50 (the left-right direction in FIG. 1) and formed by spirally overlapping only a portion of the positive electrode plate 55, and a negative electrode wound portion 56b, which is positioned in the other end portion (the right end portion in FIG. 1) and formed by spirally overlapping only a portion of the negative electrode plate 56. In the region of the positive electrode plate 55 except the positive electrode wound portion 55b, there is formed a positive electrode combining layer which contains a positive electrode active material. Similarly, in the region of the negative electrode plate 56 except the negative electrode wound portion 56b, there is formed a negative electrode combining layer which contains a negative electrode active material.

The terminal-equipped battery case lid 15 includes the lid body 13, a first insulation member 80, a positive terminal member 30, a negative terminal member 40 and a second insulation member 70. Among them, the lid body 13 is formed in an elongated flat plate shape. Circular through-holes (lid through-holes) 13h and 13k extending through the lid body 13 are formed in the opposite end portions of the longitudinal direction X of the lid body 13 (the left-right direction in FIG. 1). Furthermore, a safety valve 13j is provided in the central portion of the longitudinal direction X of the lid body 13. Moreover, a liquid pouring hole 13n for pouring an electrolyte (not illustrated) into the battery case 11 is formed between the safety valve 13j and the through-hole 13k. The liquid pouring hole 13n is sealed by a liquid pouring plug 13m.

The positive terminal member 30 is configured by a positive connection member (caulking member) 35, a positive external terminal 37 and a positive fastening member 39 (see FIGS. 1 and 3). Among them, the positive connection member 35 is made of metal and is connected to the positive electrode wound portion 55b of the electrode body 50. The positive connection member 35 extends outward through the through-hole 13h of the lid body 13. The positive external terminal 37 is made of metal and is positioned above the lid body 13 (outside the battery case 11). The positive external terminal 37 is electrically connected to the positive connection member 35 outside the battery case 11. The positive fastening member 39 is a bolt made of metal and is positioned outside the battery case 11. The positive fastening member 39 fastens the positive external terminal 37 and a bus bar not illustrated.

The negative terminal member 40 is configured by a negative connection member (caulking member) 45, a negative external terminal 47 and a negative fastening member 49 (see FIGS. 1 and 3). Among them, the negative connection member 45 is made of metal and is connected to the negative electrode wound portion 56b of the electrode body 50. The negative connection member 45 extends outward through the through-hole 13k of the lid body 13. The negative external terminal 47 is made of metal and is positioned above the lid body 13 (outside the battery case 11). The negative external terminal 47 is electrically connected to the negative connection member 45 outside the battery case 11. The negative fastening member 49 is a bolt made of metal and is positioned above the lid body 13 (outside the battery case 11). The negative fastening member 49 fastens the negative external terminal 47 and a bus bar not illustrated.

The positive external terminal 37 (the negative external terminal 47) is made from a metal plate and is formed in a substantially Z-like shape when seen in a side view (see FIGS. 1 and 3). The positive external terminal 37 (the negative external terminal 47) includes a pressing portion 37f (a pressing portion 47f), a spaced-apart portion 37g (a spaced-apart portion 47g) and a connection portion 37h (a connection portion 47h) which interconnects the pressing portion 37f (the pressing portion 47f) and the spaced-apart portion 37g (the spaced-apart portion 47g). Among them, the pressing portion 37f (the pressing portion 47f) is formed in a flat plate shape. The pressing portion 37f (the pressing portion 47f) is a portion that presses the first insulation member 80 when pressed by a caulking portion 33 (a caulking portion 43) which will be described later, The spaced-apart portion 37g (the spaced-apart portion 47g) is spaced upward from the lid body 13 so as to be positioned more upward than the pressing portion 37f (the pressing portion 47f). The spaced-apart portion 37g (the spaced-apart portion 47g) is a portion having a flat plate shape and extending parallel to the pressing portion 37f (the pressing portion 47f). A through-hole 37b (a through-hole 47b) (which corresponds to a terminal through-hole) extending through the pressing portion 37f (the pressing portion 47f) is formed in the pressing portion 37f (the pressing portion 47f). An insertion portion 32 (an insertion portion 42) of the positive connection member 35 (the negative connection member 45) is inserted into the through-hole 37b (the through-hole 47b) (see FIG. 2). In addition, a through-hole 37c (a through-hole 47c) extending through the spaced-apart portion 37g (the spaced-apart portion 47g) is formed in the spaced-apart portion 37g (the spaced-apart portion 47g).

The positive fastening member 39 (the negative fastening member 49) is a metal-made bolt and includes a rectangular plate-shaped head portion 39b (a head portion 49b) and a cylindrical columnar shaft portion 39c (a shaft portion 49c) (see FIGS. 1 and 3). The tip portion of the shaft portion 39c (the shaft portion 49c) is a thread portion 39d (a thread portion 49d). The shaft portion 39c (the shaft portion 49c) of the positive fastening member 39 (the negative fastening member 49) is inserted into the through-hole 37c (the through-hole 47c) of the positive external terminal 37 (the negative external terminal 47).

The second insulation member 70 has an electric insulation property. The second insulation member 70 is made of an elastically-deformable resin and is formed in a flat plate shape (see FIGS. 2 and 3). The second insulation member 70 has a circular through-hole 70b formed in the central portion thereof. The insertion portion 32 (the insertion portion 42) of the positive terminal member 30 (the negative terminal member 40) is inserted into the through-hole 70b. The second insulation member 70 is interposed between an upper surface 31f (an upper surface 41b of a seat portion 31 (a seat portion 41) of the positive terminal member 30 (the negative terminal member 40) and a lower surface 13b (a surface) of the lid body 13. The second insulation member 70 electrically insulates the positive connection member 35 (the negative connection member 45) and the lid body 13.

The first insulation member 80 has an electric insulation property. The first insulation member 80 is made of an elastically-deformable resin and is disposed so as to make contact with an upper surface 13p (a surface) of the lid body 13 (see FIGS. 2 and 3). The first insulation member 80 is interposed between the lid body 13 and the positive external terminal 37 (the negative external terminal 47) to electrically insulate the lid body 13 and the positive external terminal 37. The first insulation member 80 includes a head portion disposing portion 81 in which the head portion 39b of the positive fastening member 39 (the head portion 49b of the negative fastening member 49) is disposed and a portion (referred to as a force-receiving insulation portion 83) which is pressed by the pressing portion 37f of the positive external terminal 37 (the pressing portion 47f of the negative external terminal 47) so as to make contact with the upper surface 13p (the surface) of the lid body 13. Among them, the force-receiving insulation portion 83 is formed in a plate shape. A through-hole 80b (an insulation through-hole) extending through the force-receiving insulation portion 83 is formed in the force-receiving insulation portion 83 of the first insulation member 80. The insertion portion 32 of the positive terminal member 30 (the insertion portion 42 of the negative terminal member 40) is inserted into the through-hole 80b.

The positive connection member 35 includes the seat portion 31, the insertion portion 32, an electrode body connection portion 34 and the caulking portion 33 (see FIGS. 1 to 3). Among them, the seat portion 31 is formed in a rectangular plate shape and is positioned in the battery case 11. The insertion portion 32 protrudes from the upper surface 31f of the seat portion 31 in a cylindrical columnar shape. The insertion portion 32 is inserted into the through-hole 70b of the second insulation member 70, the through-hole 13h (the lid through-hole) of the lid body 13, the through-hole 80b (the insulation through-hole) of the first insulation member 80 and the through-hole 37b (the terminal through-hole) of the positive external terminal 37 (see FIG. 2). The electrode body connection portion 34 extends from the seat portion 31 toward a bottom surface 11b of the battery case 11. The electrode body connection portion 34 is welded to the positive electrode wound portion 55b of the electrode body 50.

Figure 7:
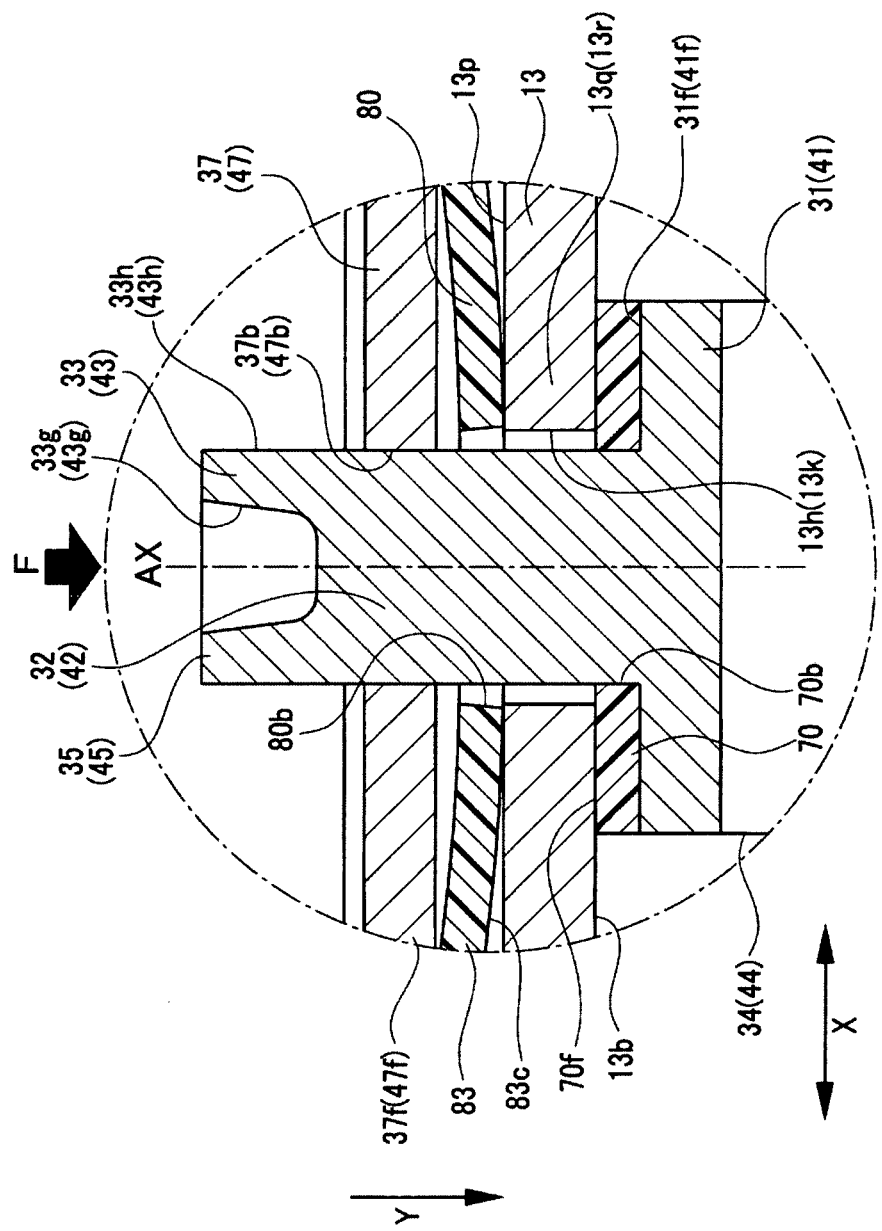
FIG. 7 is a view illustrating a state available immediately prior to caulking a caulking portion in the same region as illustrated in FIG. 2.

The caulking portion 33 is a portion joined to the upper end of the insertion portion 32. As illustrated in FIG. 7, the caulking portion 33 is kept in a cylindrical shape before the caulking portion 33 is caulked. When a caulking load F is applied to the caulking portion 33 from one side (the upper side in FIG. 7), the caulking portion 33 is deformed in such a way that the caulking portion 33 is pressed and expanded (enlarged in diameter) in a direction running from an inner circumferential surface 33g of the caulking portion 33 toward an outer circumferential surface 33h of the caulking portion 33. Thus, the caulking portion 33 is formed into a disc shape. The caulking portion 33 presses the positive external terminal 37 in the load direction Y of the caulking load F (downward in FIG. 7). Thus, the second insulation member 70, the lid body 13, the first insulation member 80 and the positive external terminal 37 are clamped between the caulking portion 33 and the seat portion 31, whereby the second insulation member 70, the lid body 13, the first insulation member 80 and the positive external terminal 37 are fastened together.

The negative connection member 45 includes the seat portion 41, the insertion portion 42, an electrode body connection portion 44 and the caulking portion 43 (see FIGS. 1 to 3). Among them, the seat portion 41 is formed in a rectangular plate shape and is positioned in the battery case 11. The insertion portion 42 protrudes from the upper surface 41f of the seat portion 41 in a cylindrical columnar shape. The insertion portion 42 is inserted into the through-hole 70b of the second insulation member 70, the through-hole 13k (the lid through-hole) of the lid body 13, the through-hole 80b (the insulation through-hole) of the first insulation member 80 and the through-hole 47b (the terminal through-hole) of the negative external terminal 47 (see FIG. 2). The electrode body connection portion 44 extends from the seat portion 41 toward the bottom surface 11b of the battery case 11. The electrode body connection portion 44 is welded to the negative electrode wound portion 56b of the electrode body 50.

The caulking portion 43 is a portion joined to the upper end of the insertion portion 42. As illustrated in FIG. 7, the caulking portion 43 is kept in a cylindrical shape before the caulking portion 43 is caulked. When a caulking load F is applied to the caulking portion 43 from one side (the upper side in FIG. 7), the caulking portion 43 is deformed in such a way that the caulking portion 43 is pressed and expanded (enlarged in diameter) in a direction running from an inner circumferential surface 43g of the caulking portion 43 toward an outer circumferential surface 43h of the caulking portion 43. Thus, the caulking portion 43 is formed into a disc shape. The caulking portion 43 presses the negative external terminal 47 in the load direction Y of the caulking load F (downward in FIG. 7). Thus, the second insulation member 70, the lid body 13, the first insulation member 80 and the negative external terminal 47 are clamped between the caulking portion 43 and the seat portion 41, whereby the second insulation member 70, the lid body 13, the first insulation member 80 and the negative external terminal 47 are fastened together.

In the present embodiment, the positive connection member 35 and the negative connection member 45 correspond to a "caulking member". Furthermore, the force-receiving insulation portion 83 corresponds to a "portion which makes contact with the surface of the lid body 13 by receiving the caulking force from the caulking member indirectly via another member".

Figure 16:
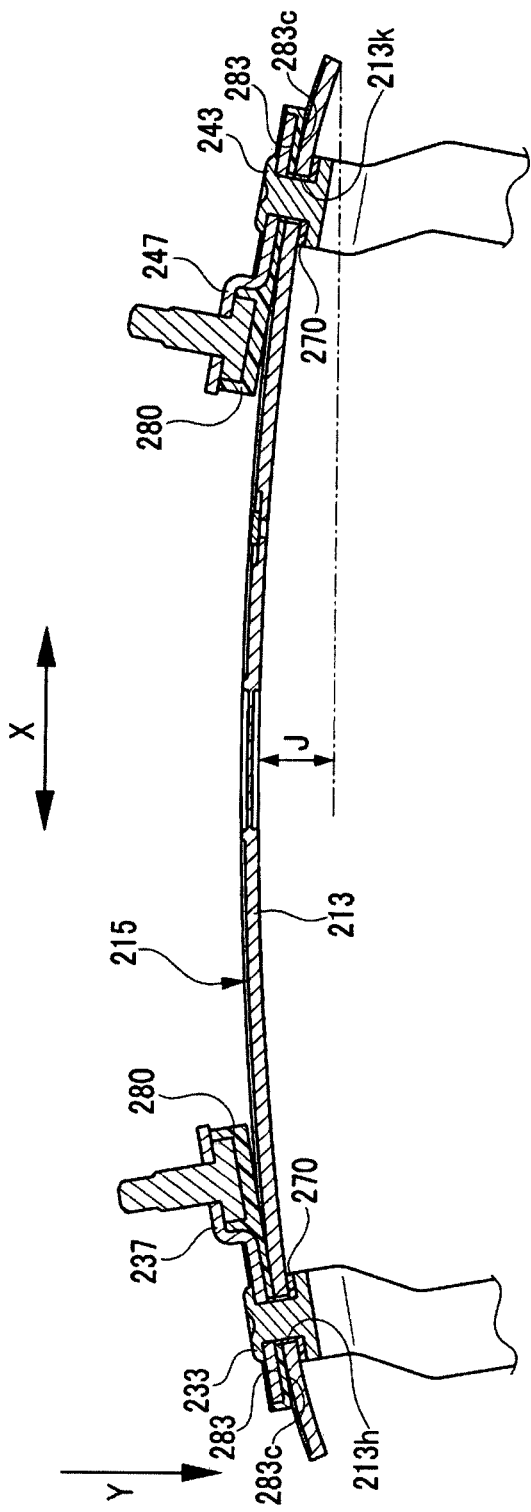
FIG. 16 is a sectional view of a terminal-equipped battery case lid according to a related art example and a comparative example 1.

As illustrated in FIG. 16, in the related art, a lid body 213 is deformed when manufacturing a terminal-equipped battery case lid 215 configured as above. Specifically, if caulking portions 233 and 243 are caulked to fasten a second insulation member 270, the lid body 213, a first insulation member 280 and a positive external terminal 237 (a negative external terminal 247), the regions of the lid body 213 (the regions around lid through-holes 213h and 213k) which receive a caulking force is bent (curved). When not receiving the caulking force, a lower surface 283c of a force-receiving insulation portion 283 of the first insulation member 280 remains planar.

As illustrated in FIG. 16, the bending (curvature) occurs in such a form that the lid body 213 bulges in a direction opposite to the load direction Y of the caulking load (upward in FIG. 16) on a cut plane (a cross section illustrated in FIG. 16) which cuts the lid body 213 in the longitudinal direction X of the lid body 213 (the left-right direction in FIG. 16). Since the caulking is performed in the opposite end portions of the lid body 213, the bending (curvature) is generated in the opposite end portions of the lid body 213. As a result, the region positioned between the opposite end portions of the lid body 213 is curved in such a form as to bulge in a direction opposite to the load direction Y of the caulking load on a cut plane (a cross section illustrated in FIG. 16) which cuts the lid body 213 in the longitudinal direction X of the lid body 213.

Thus, if the degree of deformation of the lid body 213 is large, there may be a case where a gap is generated between the battery case 11 and the lid body 213 when the opening 11d of the battery case 11 is closed by the lid body 213. If the lid body 213 and the battery case 11 are welded in this state, variations are generated in the penetration depth of welding. There is also a possibility of generation of welding defects (for example, a welding defect that the penetration depth of welding becomes smaller than a permissible lower limit value in the region where the gap is generated when the opening 11d of the battery case 11 is closed by the lid body 213).

In contrast, in the terminal-equipped battery case lid 15 of the present embodiment, the portion (the force-receiving insulation portion 83) of the first insulation member 80, which makes contact with the surface (the upper surface 13p) of the lid body 13 by receiving the caulking force either directly or indirectly via another member, has a form described below. FIGS. 4 to 7 illustrate the first insulation member 80 in a state where the first insulation member 80 does not receive the caulking force.

Specifically, as illustrated in FIGS. 4 to 7, when not receiving the caulking force, a surface (a lower surface 83c) of the force-receiving insulation portion 83 facing the lid body 13 becomes a curved surface which indicates a curve bulging in the load direction Y of the caulking load F (the applying direction of the caulking load F, namely the downward direction in FIGS. 4 to 7) on the cut plane (the cross section illustrated in FIG. 6), the cut plane cutting the force-receiving insulation portion 83 in the longitudinal direction X of the lid body 13 (the left-right direction in FIGS. 4 to 7). That is to say, the surface (the lower surface 83c) of the force-receiving insulation portion 83 facing the lid body 13 has a form opposite to "the form into which the portions (force-receiving lid body portions 13q and 13r; see FIGS. 1 and 2) of the lid body 13 receiving the caulking force tend to be deformed by the caulking force". As illustrated in FIG. 2, when fastened by the caulking force as mentioned above, the force-receiving insulation portion 83 is elastically deformed and the surface (the lower surface 83c) of the force-receiving insulation portion 83 facing the lid body 13 is brought into close contact with the surface (the upper surface 13p) of the lid body 13 (namely, deformed into a planar surface).

Thus, as described above, when the caulking portions 33 and 43 are caulked (deformed by applying the caulking load F) to fasten the second insulation member 70, the lid body 13, the first insulation member 80 and the positive external terminal 37 (the negative external terminal 47), a force (restoring force) which tries to return the surface (the lower surface 83c) facing the lid body 13 to the pre-deformation form (namely, the form opposite to the form into which the force-receiving lid body portions 13q and 13r tend to be deformed) is generated in the force-receiving insulation portion 83 elastically deformed by the caulking force.

Thus, when the caulking portions 33 and 43 are caulked as mentioned above, the force-receiving lid body portions 13q and 13r, which tend to be bent (curved) in such a form as to bulge in the direction (the upward direction in FIGS. 2 and 7) opposite to the load direction Y of the caulking load F on the cut plane cutting the lid body 13 in the longitudinal direction X of the lid body 13, is pressed in the deformation-preventing direction by the lower surface 83c of the force-receiving insulation portion 83. This makes it possible to reduce the degree of bending (curvature) of the force-receiving lid body portions 13q and 13r. As a result, it is also possible to reduce the degree of bending (curvature) of the region of the lid body 13 positioned between the opposite end portions (the two force-receiving lid body portions 13q and 13r) of the lid body 13. Accordingly, the terminal-equipped battery case lid 15 of the present embodiment becomes a terminal-equipped battery case lid in which the deformation degree of the lid body 13 is made small.

This makes it possible to reduce the gap between the battery case 11 and the lid body 13 or to prevent generation of the gap when the opening 11d of the battery case 11 is closed by the lid body 13 of the terminal-equipped battery case lid 15. It is therefore possible to reduce the variations in the penetration depth of welding when the lid body 13 and the battery case 11 are welded. It is also possible to reduce (or prevent) generation of welding defects (for example, a welding defect that the penetration depth of welding becomes smaller than a permissible lower limit value in the region where the gap is generated when the opening of the battery case 11 is closed by the lid body 13).

Next, descriptions will be made on a method of manufacturing the sealed battery 1 of the present embodiment. First, the terminal-equipped battery case lid 15 is manufactured. Specifically, the lid body 13 having an elongated flat plate shape is prepared. At this time, the liquid pouring hole 13n of the lid body 13 is not sealed by the liquid pouring plug 13m (The liquid pouring plug 13m is not installed). Furthermore, the positive connection member 35, the positive external terminal 37 and the positive fastening member 39 are prepared. Moreover, the negative connection member 45, the negative external terminal 47 and the negative fastening member 49 are prepared. In addition, two first insulation members 80 and two second insulation members 70 are prepared. At this time, the caulking portion 33 of the positive connection member 35 and the caulking portion 43 of the negative connection member 45 are not yet caulked t and, therefore, have a cylindrical shape (see FIG. 7).

Subsequently, the aforementioned members are assembled together. Specifically, the caulking portion 33 (having a cylindrical shape at this time) and the insertion portion 32 of the positive connection member 35 are first inserted from the tip side of the positive connection member 35 into the through-hole 70b of the second insulation member 70, the through-hole 13h of the lid body 13, the through-hole 80b of the first insulation member 80 and the through-hole 37b of the positive external terminal 37 in the above order (see FIG. 7). Prior to this work, the head portion 39b of the positive fastening member 39 is disposed in the head portion disposing portion 81 of the first insulation member 80, and the shaft portion 39c of the positive fastening member 39 is inserted into the through-hole 37c of the positive external terminal 37.

Thereafter, in the aforementioned state, the caulking portion 33 is caulked and the positive external terminal 37 is pressed downward (toward the seat portion 31). Specifically, by applying the caulking load F to the cylindrical caulking portion 33 from one side (from the upper side in FIG. 7), the caulking portion 33 is pressed and expanded (enlarged in diameter) in the direction running from the inner circumferential surface 33g toward the outer circumferential surface 33h of the caulking portion 33, and is deformed into a disc shape while pressing and crushing the caulking portion 33 in the load direction Y (downward in FIG. 7). By virtue of the caulking portion 33 thus deformed, the positive external terminal 37 is pressed in the load direction Y of the caulking load F (downward in FIG. 7). Thus, the second insulation member 70, the lid body 13, the first insulation member 80 and the positive external terminal 37 are clamped between the caulking portion 33 and the seat portion 31, whereby the second insulation member 70, the lid body 13, the first insulation member 80 and the positive external terminal 37 are fastened together.

Furthermore, the negative side members (the negative connection member 45, the negative external terminal 47 and the negative fastening member 49) are assembled in the same manner as the positive side members described above. Thus, the second insulation member 70, the lid body 13, the first insulation member 80 and the negative external terminal 47 are clamped between the caulking portion 43 and the seat portion 41, whereby the second insulation member 70, the lid body 13, the first insulation member 80 and the negative external terminal 47 are fastened together. Consequently, the terminal-equipped battery case lid 15 is completed.

Then, the electrode body connection portion 34 of the positive connection member 35 is welded to the positive electrode wound portion 55b of the electrode body 50. Furthermore, the electrode body connection portion 44 of the negative connection member 45 is welded to the negative electrode wound portion 56b of the electrode body 50. Thus, the positive terminal member 30 and the positive electrode plate 55 are electrically connected to each other, the negative terminal member 40 and the negative electrode plate 56 are electrically connected to each other, and the terminal-equipped battery case lid 15 and the electrode body 50 are integrated.

Subsequently, the opening 11d of the battery case 11 is closed by the lid body 13 while the electrode body 50 is provided in the battery case 11. In this state, the lid body 13 and the battery case 11 are joined by whole circumference welding. Thereafter, an electrolyte (not illustrated) is poured into the battery case 11 through the liquid pouring hole 13n of the lid body 13. The electrolyte is impregnated into the electrode body 50. Subsequently, the liquid pouring hole 13n of the lid body 13 is sealed by the liquid pouring plug 13m. Thereafter, the sealed battery 1 of the present embodiment (see FIG. 1) is completed by performing a predetermined process.

Example 1

Figure 4:
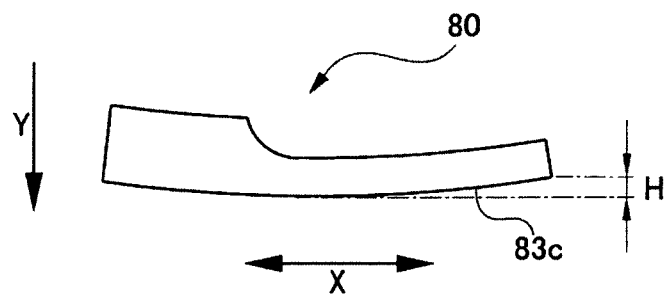
FIG. 4 is a side view of a first insulation member according to an embodiment.
Figure 5:
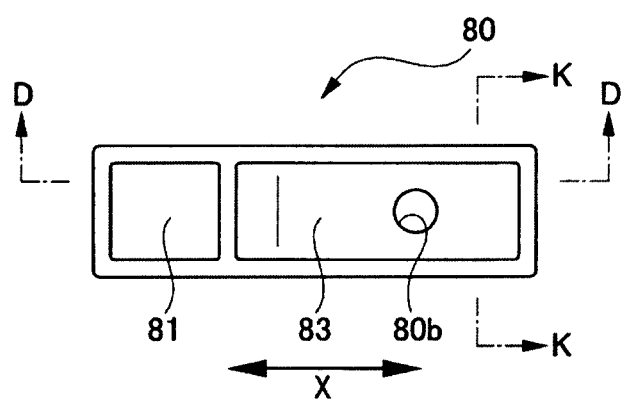
FIG. 5 is a top view of the first insulation member.

In Example 1, a first insulation member 80 in which the bending amount H of the lower surface 83c (the surface facing the lid body 13) of the force-receiving insulation portion 83 is 0.045 mm was prepared as the first insulation member 80 (see FIG. 4). A terminal-equipped battery case lid 15 according to Example 1 was manufactured using the first insulation member 80.

The bending amount H of the lower surface 83c is a value which denotes the degree of bending of the lower surface 83c. The larger the numerical value, the greater the degree of bending. The bending amount H is the Y-direction distance (height difference) between the highest point and the lowest point in the lower surface 83c. Specifically, the positions in the direction (the up-down direction in FIG. 4) extending along the load direction Y of the caulking load F are measured at a plurality of points existing over the entire lower surface 83c, and the difference between the highest point and the lowest point is regarded as the bending amount H.

Example 2

In Example 2, a first insulation member 80 in which the bending amount H of the lower surface 83c (the surface facing the lid body 13) of the force-receiving insulation portion 83 is 0.10 mm was prepared as the first insulation member 80. A terminal-equipped battery case lid 15 according to Example 2 was manufactured using the first insulation member 80.

Comparative Example 1

In Comparative Example 1, a first insulation member 280 in which the bending amount H of the lower surface 283c (the surface facing the lid body 213) of the force-receiving insulation portion 283 is 0 mm was prepared as the first insulation member (see FIG. 16). That is to say, the first insulation member 280 in which the lower surface 283c of the force-receiving insulation portion 283 is a planar surface was prepared. A terminal-equipped battery case lid 215 according to Comparative Example 1 was manufactured using the first insulation member 280.

(Measurement of Bending Amount of Lid Body)

The lid body bending amount J (see FIG. 16) was measured with respect to the terminal-equipped battery case lids of Examples 1 and 2 and Comparative Example 1. The lid body bending amount J is the Y-direction distance (height difference) between the highest point and the lowest point in the lower surface of the lid body. Specifically, the positions in the direction (the up-down direction in FIG. 16) extending along the load direction Y of the caulking load F are measured at a plurality of points existing over the entire lower surface of the lid body, and the difference between the highest point and the lowest point is regarded as the lid body bending amount J.

As a result of the measurement, the lid body bending amount J was smaller in the terminal-equipped battery case lids of Examples 1 and 2 than in the terminal-equipped battery case lid of Comparative Example 1. Specifically, in Examples 1 and 2, as compared with Comparative Example 1, it was possible to reduce the lid body bending amount J by about 24%. Furthermore, the lid body bending amount J was equal in Examples 1 and 2. From this result, it may be said that the terminal-equipped battery case lid 15 of the present embodiment is a terminal-equipped battery case lid in which the deformation degree of the lid body 13 is made small.

(Modification)

Figure 10:
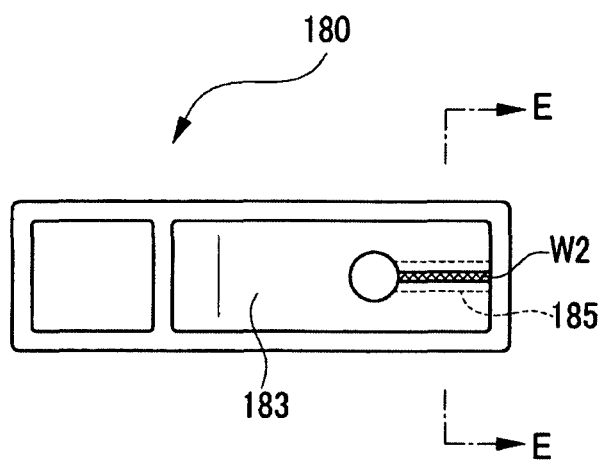
FIG. 10 is a top view of a first insulation member according to a modification.
Figure 11:
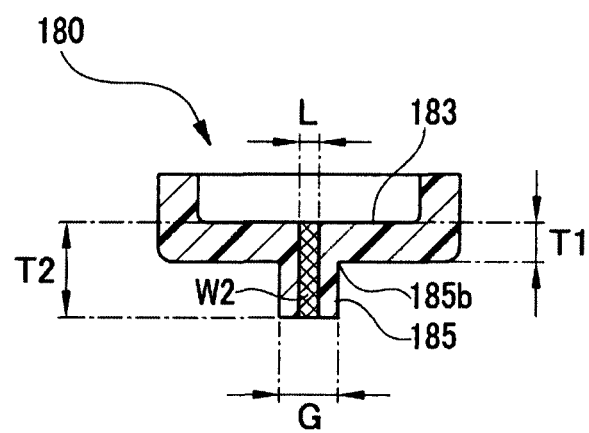
FIG. 11 is a sectional view taken along line E-E in FIG. 10.

Next, a modification of embodiments of the invention will be described with reference to the drawings. The present modification differs from the aforementioned embodiment only in terms of the form of a portion of the first insulation member and the form of a portion of the lid body. In other respects, the present modification remains the same as the aforementioned embodiment. For that reason, the points differing from the aforementioned embodiment will be described here. FIG. 10 is a top view of a first insulation member 180 according to a modification. FIG. 11 is a sectional view taken along line E-E in FIG. 10.

Figure 8:
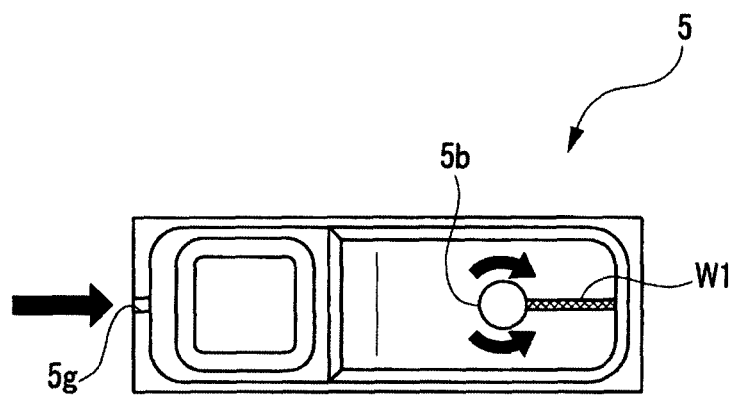
FIG. 8 is a view explaining the injection molding of the first insulation member.

In the meantime, the first insulation member 80 of the aforementioned embodiment is manufactured by, for example, injection-molding a resin through the use of a mold 5 as illustrated in FIG. 8. Since it is necessary to form the through-hole 80b in the first insulation member 80 (see FIGS. 3 and 5), a portion 5b for forming the through-hole 80b is provided in the mold 5. A molten resin flowing into the mold 5 from a gate 5g is split in front of the portion 5b and then the split molten resins are merged. Thus, in the first insulation member 80, a weld part W1 is generated in the position where the split molten resins are merged (see FIGS. 8 and 9).

Figure 9:
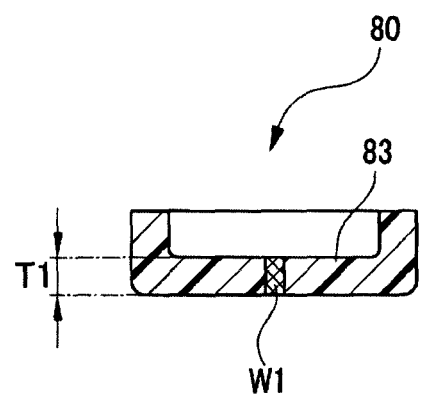
FIG. 9 is a sectional view taken along line K-K in FIG. 5.

Since the weld part is lower in strength than other parts, there is a possibility that the first insulation member 80 is broken (a crack or the like is generated) in the weld part W1. Specifically, as illustrated in FIG. 9, the weld part W1 of the first insulation member 80 exists in the force-receiving insulation portion 83 which receives the caulking force. For that reason, when the force-receiving insulation portion 83 is pressed downward (in the load direction Y) with the pressing portion 37f of the positive external terminal 37 by, for example, performing the caulking in the aforementioned manner, a bending stress is generated in the weld part W1. Thus, there is a possibility that the first insulation member 80 is broken (a crack or the like is generated) from the weld part W1 as a starting point.

In contrast, in the first insulation member 180 of the present modification, as illustrated in FIG. 11, the weld part is made strong by allowing the thickness T2 of a weld part W2 to become larger than the thickness T1 of the weld part W1 of the first insulation member 80. In FIG. 11, for the sake of comparison, the thickness (T1) of the weld part W1 of the first insulation member 80 according to the aforementioned embodiment is indicated as T1. Moreover, in the first insulation member 180 of the present modification, a rib 185 having a width larger than the width dimension L of the weld part W2 (having a width dimension G) is provided in such a form as to cover the weld part W2. Thus, when a force-receiving insulation portion 183 is pressed downward (in the load direction Y) with the pressing portion 37f of the positive external terminal 37 by performing the aforementioned caulking, a bending stress is generated in a root 185b of the rib 185 (a boundary between the rib 185 and the force-receiving insulation portion 183). Since the rib 185 is stronger than the weld part W2, it is possible to suppress breakage of the first insulation member 180.

In the sealed battery 1 of the aforementioned embodiment, the positive external terminal 37 and a bus bar not illustrated are fastened by inserting the shaft portion 39c of the positive fastening member 39 into a through-hole of the bus bar and thread-coupling a nut not illustrated to the thread portion 39d of the positive fastening member 39. At this time, as illustrated in FIGS. 1 to 3, the positive external terminal 37 is fixed to the lid body 13 through the use of caulking by inserting the insertion portion 32 of the positive connection member 35 into the through-hole 80b of the first insulation member 80 and the through-hole 37b of the positive external terminal 37 while the pressing portion 37f is provided in the first insulation member 180. However, if the tightening force of the nut is large, there is a possibility that the positive external terminal 37 and the first insulation member 80 may rotate about the insertion portion 32 of the positive connection member 35 as a rotation axis. This holds true in the negative external terminal 47.

Figure 12:
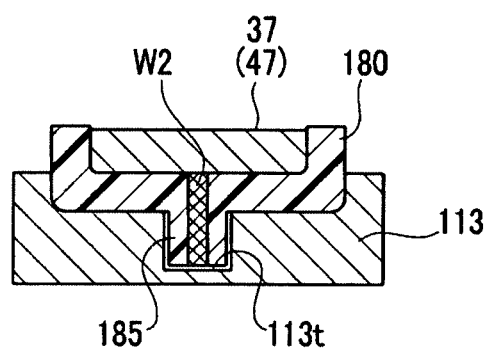
FIG. 12 is a view illustrating a state in which the first insulation member and the external terminal are fixed to the lid body.

In contrast, in the present modification, a recess portion 113t into which the rib 185 of the first insulation member 180 is inserted is provided in a lid body 113 (see FIG. 12). The recess portion 113t has an inner dimension slightly larger than the outer dimension of the rib 185. FIG. 12 is a sectional view illustrating a state in which the first insulation member 180 and the positive external terminal 37 (the negative external terminal 47) are fixed to the lid body 113. FIG. 12 corresponds to a sectional view obtained by cutting the terminal-equipped battery case lid in the transverse direction of the lid body 113.

In the present modification, as illustrated in FIG. 12, a sealed battery (a terminal-equipped battery case lid) is manufactured in the same manner as the aforementioned embodiment while inserting the rib 185 of the first insulation member 180 into the recess portion 113t of the lid body 113. This makes it possible to restrain the positive external terminal 37 and the first insulation member 180 from rotating about the insertion portion 32 of the positive connection member 35 as a rotation axis. This is because, if the positive external terminal 37 and the first insulation member 180 try to rotate about the insertion portion 32 of the positive connection member 35 as a rotation axis, the rib 185 of the first insulation member 180 makes contact with the inner surface of the recess portion 113t of the lid body 113, thereby hindering the rotation. This holds true in the negative external terminal 47.

While embodiments of the invention have been described above on the basis of the embodiment and the modification, it goes without saying that the invention is not limited to the aforementioned embodiments and the like but may be appropriately modified without departing from the spirit thereof.

For example, in the aforementioned embodiment, the lower surface 83c (the surface facing the lid body 13) of the force-receiving insulation portion 83 of the first insulation member 80 is formed into a curved shape, thereby suppressing deformation of the lid body 13. Alternatively, the upper surface 70f of the second insulation member 70 may be formed into a curved shape. Specifically, it may be possible to use a second insulation member 170 illustrated in FIGS. 13 to 15. The entirety of the second insulation member 170 becomes "a portion (force-receiving insulation portion) which makes contact with the surface (the lower surface 13b) of the lid body 13 by receiving the caulking force from the positive connection member 35 and the negative connection member 45 (the caulking member) either directly or indirectly via another member".

Figure 13:
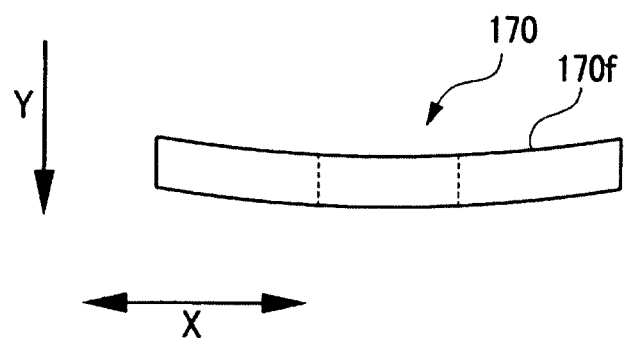
FIG. 13 is a side view of a second insulation member according to another embodiment.
Figure 14:
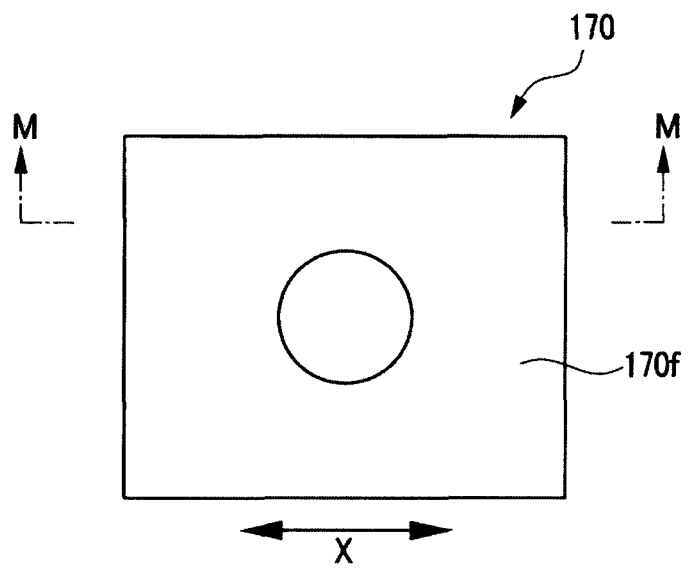
FIG. 14 is a top view of the second insulation member.
Figure 15:
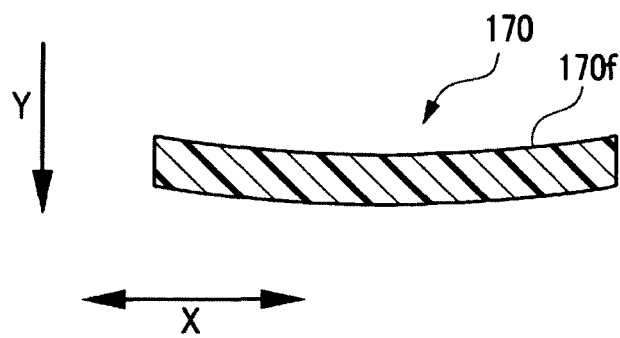
FIG. 15 is a sectional view taken along line M-M in FIG. 14.

The second insulation member 170 has the following form. Specifically, as illustrated in FIGS. 13 to 15, when not receiving the caulking force, the surface (the upper surface 1700 of the second insulation member 170 (the force-receiving insulation portion) facing the lid body 13 becomes a curved surface which indicates a curve bulging in the load direction Y of the caulking load F on the cut plane (the cross section illustrated in FIG. 15), the cut plane cutting the second insulation member 170 in the longitudinal direction X of the lid body 13. That is to say, the surface (the upper surface 1700 of the second insulation member 170 facing the lid body 13 takes a form opposite to "the form into which the portions (the force-receiving lid body portions 13q and 13r) of the lid body 13 receiving the caulking force tend to be deformed by the caulking force". When fastened by the caulking force as mentioned above, the second insulation member 170 is elastically deformed and the surface (the upper surface 1700 of the second insulation member 170 facing the lid body 13 is brought into close contact with the surface (the lower surface 13b) of the lid body 13 (namely, deformed into a planar surface).

Thus, as described above, when the caulking portions 33 and 43 are caulked (deformed by applying the caulking load F) to fasten the second insulation member 170, the lid body 13, the first insulation member and the positive external terminal 37 (the negative external terminal 47), a force (restoring force) which tries to return the surface (the upper surface 1700 facing the lid body 13 to the pre-deformation form (namely, the form opposite to the form into which the force-receiving lid body portions 13q and 13r tend to be deformed) is generated in the second insulation member 170 elastically deformed by the caulking force.

Thus, when the caulking portions 33 and 43 are caulked as mentioned above, the force-receiving lid body portions 13q and 13r, which tend to be bent (curved) in such a form as to bulge in the direction (the upward direction) opposite to the load direction Y of the caulking load F on the cut plane cutting the lid body 13 in the longitudinal direction X of the lid body 13, is pressed in the deformation-preventing direction by the upper surface 170f of the second insulation member 170. This makes it possible to reduce the degree of bending (curvature) of the force-receiving lid body portions 13q and 13r. As a result, it is also possible to reduce the degree of bending (curvature) of the region of the lid body 13 positioned between the opposite end portions (the two force-receiving lid body portions 13q and 13r) of the lid body 13. Accordingly, it is possible to reduce the deformation degree of the lid body 13.

Figure 6:
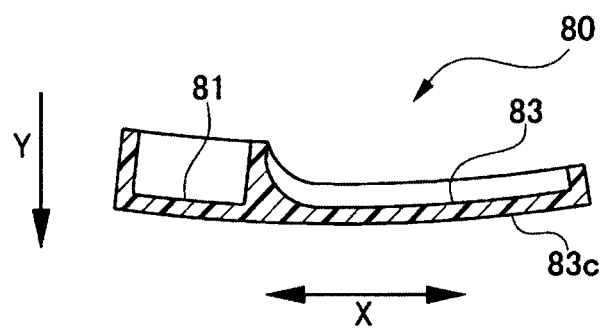
FIG. 6 is a sectional view taken along line D-D in FIG. 5.

Furthermore, in the aforementioned embodiment, the entire lower surface of the first insulation member 80 is formed into a curved shape (see FIGS. 4 and 6). Alternatively, only the lower surface 83c of the force-receiving insulation portion 83 may be formed into a curved shape. Moreover, in the aforementioned embodiment, not only the lower surface 83c of the force-receiving insulation portion 83 but also the upper surface of the force-receiving insulation portion 83 is formed into a curved shape (The force-receiving insulation portion 83 is formed into a curved plate shape having a constant thickness). Alternatively, only the lower surface 83c may be formed into a curved shape (For example, the upper surface may be a planar surface). This is because the effects of the invention may be achieved by forming the lower surface 83c of the force-receiving insulation portion 83 into a curved shape.

Furthermore, in the aforementioned modification, the rib 185 of the first insulation member 180 has a form that surrounds the entire weld part W2. Alternatively, the rib 185 of the first insulation member 180 may have a form that surrounds a portion of the weld part W2. This is because the breakage of the first insulation member from the weld part W2 as a starting point may be suppressed at least in the region where the rib is formed.

What is claimed is:

1. A terminal-equipped battery case lid, comprising:
   a lid body formed in an elongated flat plate shape and having lid through-holes formed in longitudinal opposite end portions of the lid body;
   an insulation member disposed so as to make contact with a surface of the lid body and having an insulation through-hole extending through the insulation member;
   an external terminal having a terminal through-hole extending through the external terminal; and
   a caulking member inserted into each of the lid through-holes, the insulation through-hole and the terminal through-hole, the caulking member being deformed by a caulking load, which is applied to the caulking member from one side, to fasten the lid body, the insulation member and the external terminal together,
   wherein a portion of the insulation member, which makes contact with the surface of the lid body by receiving a caulking force from the caulking member either directly or indirectly via another member, is configured such that:
      when not receiving the caulking force, a surface of the portion of the insulation member facing the lid body becomes a curved surface which indicates a curve bulging in a load direction of the caulking load on a cut plane, the cut plane cutting the portion of the insulation member in a longitudinal direction of the lid body; and
      when kept in a fastened state by receiving the caulking force, the portion of the insulation member is elastically deformed and the surface of the portion of the insulation member facing the lid body is brought into close contact with the surface of the lid body.

2. The terminal-equipped battery case lid according to claim 1, wherein the insulation member is interposed between the lid body and the external terminal and electrically insulates the lid body and the external terminal, and
   a portion of the insulation member, which receives the caulking force via the external terminal and is pressed by the external terminal to make contact with the surface of the lid body, is configured such that:
      when not receiving a pressing force from the external terminal, a surface of the portion of the insulation member facing the lid body becomes a curved surface which indicates a curve bulging in a direction of the pressing force on a cut plane, the cut plane cutting the portion of the insulation member in the longitudinal direction of the lid body; and
      when receiving the pressing force, the portion of the insulation member is elastically deformed and the surface of the portion of the insulation member facing the lid body is brought into close contact with the surface of the lid body.

3. The terminal-equipped battery case lid according to claim 2, wherein the external terminal includes: a flat plate-shaped pressing portion that presses the insulation member, the flat plate-shaped pressing portion having the terminal through-hole; a flat plate-shaped spaced-apart portion spaced apart from the lid body farther than the flat plate-shaped pressing portion, the spaced-apart portion extending parallel to the flat plate-shaped pressing portion; and a connection portion that interconnects the flat plate-shaped pressing portion and the spaced-apart portion.

4. A sealed battery comprising:

a box-shaped battery case having an opening; and a terminal-equipped battery case lid including:

a lid body formed in an elongated flat plate shape and having lid through-holes formed in longitudinal opposite end portions of the lid body, an insulation member disposed so as to make contact with a surface of the lid body and having an insulation through-hole extending through the insulation member, an external terminal having a terminal through-hole extending through the external terminal, and a caulking member inserted into each of the lid through-holes, the insulation through-hole and the terminal through-hole, the caulking member being deformed by a caulking load, which is applied to the caulking member from one side, to fasten the lid body, the insulation member and the external terminal together, wherein a portion of the insulation member, which makes contact with the surface of the lid body by receiving a caulking force from the caulking member either directly or indirectly via another member, is configured such that:

when not receiving the caulking force, a surface of the portion of the insulation member facing the lid body becomes a curved surface which indicates a curve bulging in a load direction of the caulking load on a cut plane, the cut plane cutting the portion of the insulation member in a longitudinal direction of the lid body, and when kept in a fastened state by receiving the caulking force, the portion of the insulation member is elastically deformed and the surface of the portion of the insulation member facing the lid body is brought into close contact with the surface of the lid body;

wherein the lid body closes the opening of the battery case, and the lid body and the battery case are welded in a state where the opening of the battery case is closed by the lid body.

* * * * *